B. F. RICHARDSON.
VEHICLE-AXLE AND WHEEL.
No. 174,091. Patented Feb. 29, 1876.
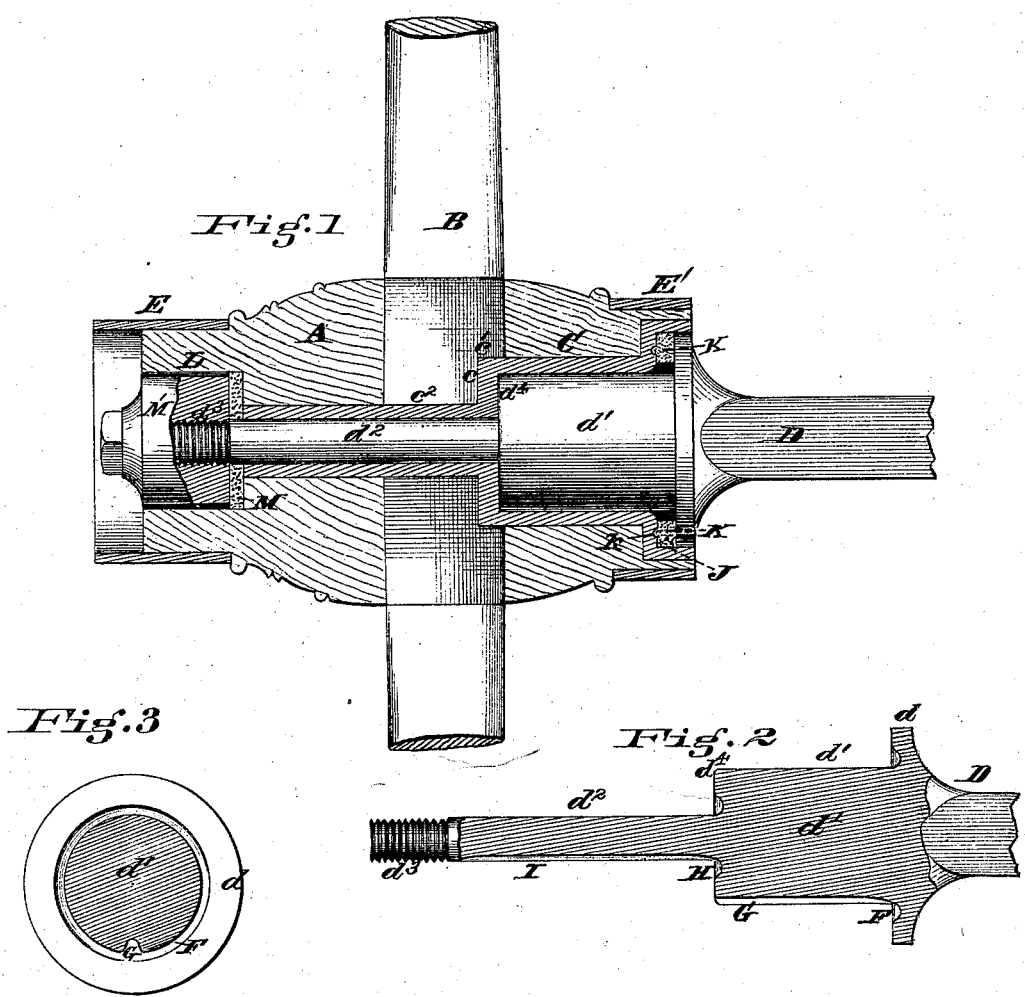

UNITED STATES PATENT OFFICE.

BENJAMIN F. RICHARDSON, OF CINCINNATI, OHIO.

IMPROVEMENT IN VEHICLE AXLES AND WHEELS.

Specification forming part of Letters Patent No. 174,091, dated February 29, 1876; application filed January 12, 1876.

*To all whom it may concern:*

Be it known that I, BENJAMIN F. RICHARDSON, of Cincinnati, Hamilton county, and State of Ohio, have invented Improvements in the Wheels and Axles of Vehicles, of which the following is a specification:

My improvements have for their object the strengthening of the axle without materially adding to its weight, and, through it and its box, the re-enforcement or strengthening of the spokes and hub, and also the provision of better lubricating devices and dust and dirt guards.

My invention consists, in the first part, in forming the axle-arm on which the wheel revolves of two different diameters, the larger part having a greater area in cross-section than the body of the axle, the smaller part so reduced as to be much below the ordinary size, and the shoulder between the two parts of the arm being located to permit great depth of the spoke-tenons, and enable the strain or pressure to be almost wholly supported by the larger part of the arm, the object being to prevent the breakage of the axle-arm at or near its junction with the axle-collar, where it is impossible to securely repair, and confine all the detrimental effects to the axle-body, which may either bend or break without incurring serious difficulty in repairs; the object, also, being to give greater security to the connection between the hub and spokes.

My invention consists, in the second part, in a certain construction of the axle and box, and the location of the same with relation to the spokes of the hub, that the main supporting and resisting part of the axle is not only of much larger diameter than the outer and lesser part, but the box is made to correspond with the arm in this configuration, and the outer large part of the box is made to project into a recess, cut so far into the hub as to encroach upon and partly remove the original width of the spoke-tenons, for the purpose of giving a corresponding form to the box, so that it will not rob the hub of strength at any material point, and providing such connection between the spokes, box, and axle-arm as to enable the spokes to be shouldered and solidly supported upon the large diameter of the box and axle-arm.

My invention consists, in the third part, of a groove in the face of the collar of the axle, the inner border being level with the surface of the arm, said groove communicating with a longitudinal groove in the large portion of the axle-arm, for the purpose of retaining and conveying the lubricant to the axle-arm and box. Similar grooves may be formed in the shoulder and small part of the arm of my peculiarly-shaped axle for a like purpose.

My invention consists, in the fourth part, in the provision of a socket in the large part of the box, and one, also, in the outer end of the hub, for the reception of the collar of the axle, the retaining-nut, and the leather washers, the whole forming guards to prevent the ingress of dust or dirt to the operative parts of the axle and box.

My invention consists, in the fifth part, in an axle-collar, box, and hub-sockets, leather washers, and lubricator-grooves, as herein more particularly described, which, when in their proper operative relation to each other, retain the lubricant when applied, and afford uniform and prolonged lubrication.

A is the wooden hub, B the spokes of the wheel, C the hub-box, and D the axle. The axle is of the following peculiar construction: It is provided with the ordinary collar $d$, and its arm is of two diameters, as shown at $d^1$ $d^2$, with the usual screw-threaded end $d^3$ for the nut. I make the axle-arm of different diameters, offseted, as shown at or near the inner line of the spokes, in the following relation to the other parts of the axle, and for the following reasons: The body D of the axle is of the ordinary size and strength, proportioned to the style and use of the vehicle it is designed to support, and my intention is, in the application of my invention to vehicles, not to add materially to the weight of the vehicle, although my invention provides material addition to its strength and security. I therefore leave the axle-body of the ordinary size, and divide the axle-arm into two lengths of different diameters, the smaller part $d^2$ being less, comparatively, than the ordinary ends of axle-arms, and the larger part $d^1$ so much larger, necessarily, as that its area in cross-section shall materially exceed the sectional area of the body of the axle. This proportion and relation of the parts, while it does not materially increase the weight of the axle, gives the following important advantages: First. The provision of the small part $d^2$, smaller, owing to the provision of part $d^1$, than is possible in ordinary axles, permits the use of much deeper spoke-tenons. with a given sized hub, than can be provided for with the ordinary form of axle. Second. The provision of the large part $d^1$ provides for the almost entire support of the vehicle on that part in the hub-box; and while it renders possible the employment of a smaller end, $d^2$, than can be used in ordinary axles, with its accompanying advantages, in the extra length of the tenons, and prevents the fracture of the arm at or near the collar-junction, it provides for the distribution of the sudden strains throughout the length of the axle-body, and confines the bending and breakages to the said axle-body, which, if found under unusual shocks or strains to bend or break, can be easily and conveniently repaired. The relative diameters of the large and small portions of the axle-arm should not be less than as two to one, and the large portion may be as much larger than the small portion as may be desired, in its application to the larger sized vehicles.

The box C is of the same form as the axle-arm, and the large portion extends so far into the hub that the spoke-tenons have to be cut away and shouldered, so as to secure a location for the shoulder $c$ of the box under a portion of the width of the tenons. The spokes are not shown in cross-section in a plane at right angles to the axis in the drawing, but they may, in such cross-section, have tenons which are tapering, and which are thicker at the periphery of the hub than in the interior thereof, and this tapering tenon may shoulder upon the outer surface of the hub, and also upon the box, as shown in the drawing. This feature not only retains, in the main, the great depth of spoke-tenons, occasioned by the smallness of the part $d^2$, but it provides an extra shoulder, $c^1$, upon the spokes, much farther away from the axle-center than the inner shoulder $c^2$, against the small part of the hub-box; and this outer shoulder $c^1$ gives each spoke a solid bearing upon the box, and through it upon the large part of the axle-arm, which is calculated and serves to give great strength to the spokes in their connection with the hub, and in their resistance of both lateral and vertical strains or pressure. The spoke-mortises are preferably made in or near the center of the hub, and the relative increase in diameter of large part of axle-arm and spoke-tenon bed occurs within the ordinary size of hub. The depth of tenons due to the construction of this axle and box enables the use, also, of tenons of corresponding width; so that, while I am enabled to secure deep tenons, I use a spoke of corresponding strength exterior to the hub, as well as within it.

The ordinary metal bands E E' are provided at the ends of the hub to prevent splitting, and it (the hub) may be made more secure by two additional metal bands being firmly fixed upon its outer surface, one on each side of the spokes; being so placed, however, as not to give direct lateral support to the spokes, as the latter, owing to the deep tenons and their proportionate strength, do not require it. The sides of the axle-arm $d^1$ $d^2$ are preferably parallel, for I am thus enabled to use upright spokes in a wheel not dished.

In order to provide for the retention of the lubricant for a long period, I provide a curved groove, F, in the collar $d$, and I also provide a longitudinal groove, G, in the part $d^1$ of the axle-arm. The lubricant being applied when the wheel is off the arm, its retention in the grooves is properly secured when the wheel is on. This device may be repeated at H, in the arm, and I, in the small part $d^2$. The hub-box at the inner end is provided with a socket, J, into which the collar $d$ of the axle projects; the space between the collar and socket-face is occupied by a washer, K, of leather or other suitable material, and the socket L of the hub is fitted with a washer, M, under the nut M', of same material as washer K. These sockets and washers, with the axle-collar and retaining-nut, prevent the entrance of dirt or dust to the axle-arm at either end, and, by their elasticity, secure the retention and efficiency of the lubricant.

To facilitate the holding of the washer K in place, I make a small groove, $k$, in the face of the box-socket, into which the washer K may become in part imbedded and fixed, by pressure or otherwise. It will be observed that the shoulder $d^4$ of the axle-arm will prevent the face of socket J of the box from pressing upon and wearing the washer K, thereby obviating the frequent renewal of said washer. The part $d^2$ of the axle-arm, in place of being in one piece with the axle, may be tapped into the part $d^1$, the latter being large enough to permit such construction without detriment, and this construction enables the employment of steel, or different metal from that which may be used in the other parts of the axle.

The box $c$ may be slightly tapering externally in either or all of its parts, so as to enable it to be driven tightly in, and it is provided with the usual cleats or wings to prevent its displacement circularly.

I claim—

1. The axle D, having its arm in two lengths offsetted to make different diameters, the larger of which has greater sectional area and strength than the sectional area and strength of the body of the axle, substantially as and for the purpose specified.

2. A carriage or wagon wheel having an axle-box of different diameters, so as to give great depth of spoke-tenons, and a separate shoulder, $c^1$, for the spokes to shoulder and rest thereon.

3. In connection with the axle-arm, the lubricator-grooves F G, operating substantially as and for the purpose specified.

4. The combination of dust and dirt preventing chambers J L, washers K M, axle-collar $d$, and retaining-nut M′, operating substantially as and for the purpose specified.

5. The combination of chambers J L, washers K M, axle-collar $d$, and grooves F G H I, operating substantially as and for the purpose specified.

In testimony of which invention I hereunto set my hand.

BENJN. F. RICHARDSON.

Witnesses:
S. B. SPEAR,
G. W. SCHROERLUCKE.